United States Patent [19]

Peiffer et al.

[11] Patent Number: 4,608,425

[45] Date of Patent: Aug. 26, 1986

[54] HIGH CHARGE DENSITY POLYMERIC COMPLEXES - VISCOSIFIERS FOR ACID, BASE AND SALT (AQUEOUS) SOLUTIONS

[75] Inventors: Dennis G. Peiffer, East Brunswick; Robert D. Lundberg, Bridgewater, both of N.J.

[73] Assignee: Exxon Research and Engineering Co., Florham Park, N.J.

[21] Appl. No.: 747,427

[22] Filed: Jun. 21, 1985

Related U.S. Application Data

[63] Continuation-in-part of Ser. No. 688,237, Jan. 2, 1985, abandoned.

[51] Int. Cl.[4] .............................................. C08F 20/60
[52] U.S. Cl. .................................... 526/241; 526/240; 526/287
[58] Field of Search ........................ 526/240, 241, 287

[56] References Cited

U.S. PATENT DOCUMENTS 4,305,860 12/1981 Iovine ................................. 526/287

Primary Examiner—Paul R. Michl
Attorney, Agent, or Firm—Richard E. Nanfeldt

[57] ABSTRACT

The present invention relates to improved viscosification agents for a variety of aqueous solutions which comprise a family of intramolecular polymeric complexes (i.e., polyampholytes) which are copolymers of metal styrene sulfonate/methacrylamidoproplytrimethylammonium chloride (MAPTAC). The metal styrene sulfonate is an anionic monomer, while MAPTAC is cationically charged. These polyampholytes have approximately 1 to about 99 mole % of the anionic monomer and approximately 1 to about 99 mole % of the cationic moiety present within the macromolecular structure. These groups are not necessarily present in an equimolar charge ratio. The excess undissociated charge allows for facile dispensability or solubility of the polyampholytes into low ionic strength aqueous solutions.

10 Claims, 2 Drawing Figures

HIGH CHARGE DENSITY POLYMERIC COMPLEXES - VISCOSIFIERS FOR ACID, BASE AND SALT (AQUEOUS) SOLUTIONS

FIELD OF THE INVENTION

The present invention relates to improved viscosification agents for a variety of aqueous solutions which comprise a family of intramolecular polymeric complexes (i.e., polyampholyte) which are copolymers of metal styrene sulfonate/methacrylamidopropyltrimethylammonium chloride (MAPTAC).

The metal styrene sulfonate is an anionic monomer, while MAPTAC is cationically charged. These polyampholytes have approximately 1 to about 99 mole % of the anionic monomer and approximately 1 to about 99 mole % of the cationic moiety present within the macromolecular structure. These groups are not necessarily present in an equimolar charge ratio. The excess undissociated charge allows for facile dispensability or solubility of the polyampholytes into low ionic strength aqueous solutions.

BACKGROUND OF THE INVENTION

Polymeric materials are generally considered useful as viscosification agents when dissolved in an appropriate solvent system. The major reason for this viscosity enhancement is due to the very large dimensions of the individual polymer chain as compared to the dimension of the single solvent molecules. Any increase in size of the polymer chain will produce a corresponding enhancement in the viscosity of the solution. This effect is maximized, when the polymer is dissolved in a "good" solvent. Therefore, in general, a hydrocarbon soluble polymer is useful for thickening hydrocarbon solvents, while a water soluble polymer is appropriate for increasing the viscosity of aqueous systems. With regard to aqueous systems, polyelectrolytes are very useful and the most commonly used materials; however, the solution properties of these materials begin to deteriorate as low molecular additives (i.e., acids, bases or salts) are dissolved in the solution. These additives screen the charges that are fixed along the chain backbone which results in a decrease in the dimensions of the polymer molecule. The viscosity diminishes as long as the chain continues to shrink.

The instant invention discloses that intramolecular polymeric complexes (i.e., polyampholytes), composed of cationic and anionic monomeric units, can be useful in viscosifying aqueous solution systems. The two moieties need not be present in an equimolar amount. More importantly, these polymeric materials possess higher viscosity in acid, base or salt solutions than in the corresponding low ionic strengh water systems. (A distinguishing characteristic of these materials is their insolubility in fresh water). Even more interesting is that these polymeric materials show a corresponding viscosity enhancement as the concentration of the dissolved acid, base or salt is increased. These viscosity results are unexpected since the general tendency of homogeneously charged macromolecules in these types of aqueous solutions shows a marked decrease in thickening efficiency.

Typical water soluble monomers incorporated into the copolymers that are envisioned in the present invention are listed as follows:

Anionic: 2-acrylamido-2-methylpropane sulfonic acid, sodium styrene sulfonate, (meth)acrylic acid, 2-sulfoethylmethacrylate, and the like.

Cationic: methacrylamidopropyltrimethylammonium chloride, dimethyldiallylammonium chloride, diethyldiallylammonium chloride, 2-methacryloxy-2-ethyltriethylmmonium chloride, trimethylmethacryloxythylammonium methosulate, 2-acrylamido-2-methylpropyltrihylammonium chloride, vinylbenzyltrithylammonium chloride, and the like.

These monomers possess the appropriate water solubility for polymerization to take place.

Salamone et al, of the University of Lowell (Massachusetts), have investigated ampholytic polymers. They have studied the solution properties of divinylic cationic-anionic monomer pairs and also cationic-anionic monomer pairs with a neutral comonomer. This latter group of materials contains styrene as the neutral comonomer (J. Polym. Sci. Al, 18, 2983 [1980], which can be incorporated into the ampholytic macromolecular structure through both solution or emulsion polymerization schemes. Apparently, other neutral vinylic monomers (i.e., acrylamide) were also polymerized (Gordon Research Conference-1981); but as of the present time, reports of this work have not been published in the scientific literature. However, in all of Salamone's work, detailed descriptions of his synthesis is reported. In all instances, the polymerization of the anionic-cationic monomeric species occurred via an "ion-pair comonomers that have no nonpolymerizable counterions present" (J. Polym. Sci.-Letters, 15, 487 [1977]. The physical and chemical properties of these ion-pair comonomers are quite different than the individual ions (J. Polym. Sci.-Letters, 15, 487 [1977]. In addition, excess dissociable charges are not present within these polymeric materials.

Recently, Iovine, et al. (U.S. Pat. No. 4,305,860) describes the use of solvent-free colloidal polyampholytes containing between 15-60 mole percent of charged monomers.

These *latices,* which are true colloids even in dilute solutions, demonstrate unexpectedly good performance characteristics in view of the traditional thinking that colloidal copolymers do not perform as well on their *solution* counterparts in wet end applications.

Furthermore, it is noted:

As used herein, the term "latices" refers to colloidal dispersions of a *solid* copolymer in water, which dispersions are prepared without the use of a solvent and which retain their colloidal nature on dilution.

The polyampholytes described herein (charged monomer concentration 100 mole percent) form homogeneous solutions with markedly improved solution properties as the level of dissolved salt, acid or base is increased. This is important since, as described previously, the individual dissolved polymer molecules determine the solution properties of our aqueous salt (or acid or base) system. *Rigid* insoluble polyampholyte latices are not useful (or able to) in viscosifying such aqueous solutions because the polymer chains are not soluble and thus are not able to expand in the solution volume and subsequently substantially improve the solution properties of the above-mentioned solutions.

Finally, Example V in U.S. Pat. No. 4,305,860 demonstrates that the colloidal latices of their invention have a very distinctive advantage over homogeneous solutions of polyamide copolymers with regard to their utilization in paper production. The preferred and claimed solids content is about 10% to 40% by weight. The preferred concentration range of the instant invention is from 0.001% to about 20% by weight in the above described aqueous solutions containing high concentrations of acid, base or salt.

SUMMARY OF THE INVENTION

The present invention relates to improved viscosification agents for an aqueous solution which can contain high concentrations of acids, bases or salts. Typically, the viscosification agents are intramolecular polymeric complexes (i.e., polyampholytes) which are formed by a free radical copolymerization of sodium styrene sulfonate monomer and methacrylamidopropyltrimethylammonium chloride monomer, wherein the formed water soluble copolymers have the formula:

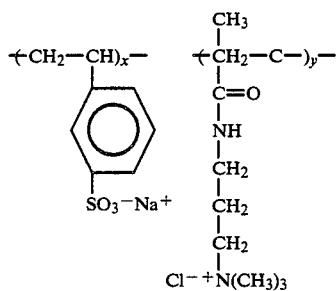

wherein x is about 1 to about 99 mole %, more preferably about 5 to about 75 mole %, and most preferably about 10 to about 65 mole %; and y is about 1 to about 99 mole %, more preferably about 5 to about 75 mole %, and most preferably about 10 mole % to about 65 mole%. These ionic groups are not necessarily present in an equimolar charge ratio, since the excess undissociated charge allows for facile dispensibility of the polyampholytic into low ionic strength aqueous solutions.

GENERAL DESCRIPTION

The instant invention describes a new class of copolymers which are improved viscosification agents for aqueous solutions containing acid, base or salt. Typically, these copolymers are formed by a free radical copolymerization process in an aqueous medium contining a sodium styrene sulfonate monomer and a methacrylamidopropyltrimethylammonium chloride monomer. The resultant water soluble copolymer has the formula:

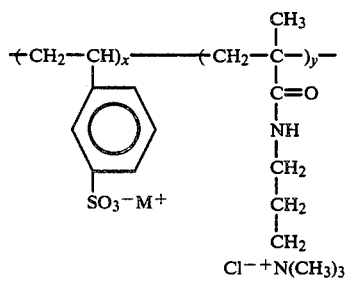

wherein x is about 1 to about 99 mole %, more preferably about 5 to about 75 mole %, and most preferably about 10 to about 65 mole %; y is about 1 to about 99 mole %, more preferably about 5 to about 75 mole %, and most preferably about 10 to about 65 mole %; and M is an amine or a metal cation selected from the group consisting of aluminum, iron, lead, Groups IA, IIA, IB and IIB of the Periodic Table of Elements.

The molecular weight, as derived from intrinsic viscosities, for the copolymers of metal styrene sulfonate/methacrylamidopropyltrimethylammonium chloride is about $10^3$ to about $5 \times 10^6$, more preferably about $10^4$ to about $2 \times 10^6$, and most preferably about $10^5$ to about $10^6$. The means for determining the molecular weights of the water soluble copolymers from the viscosity of solutions of the copolymers comprises the initial isolation of the water soluble copolymers, purification and redissolving the copolymers in low ionic strength aqueous solutions to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well known Mark-Houwink relationship.

The aqueous solution soluble copolymers of sodium styrene sulfonate/methacrylamidopropyltrimethylammonium chloride are formed by a conventional free radical copolymerization in an aqueous medium which comprises the steps of forming a reaction solution of sodium styrene sulfonate monomer and methacrylamidopropyltrimethylammonium chloride monomer (typically 50 wt.% solution in water) in distilled water, wherein the total monomer concentration is about 1 to about 40 grams of total monomer per 100 grams of water, more preferably about 5 to about 30, and most preferably about 10 to about 20; purging the reaction solution with nitrogen; adding sufficient acid to the reaction solution to adjust the pH of the reaction solution to about 4.5 to about 5.0; heating the reaction solution to about 55° C. while maintaining the nitrogen purge; adding sufficient free radical initiator to the reaction solution to about 55° C. to initiate copolymerization of the sodium styrene sulfonate monomer and the methacrylamidopropyltrimethylammonium chloride monomer; copolymerizing said monomers of sodium styrene sulfonate and methacrylamido propyltrimethylammonium chloride at a sufficient temperature and for a sufficient period of time to form said water soluble copolymer; and recovering said water soluble copolymer from said reaction solution.

The total concentration of monomers in the water is about 1 to about 40 grams of total monomer per 100 grams of water, more preferably about 5 to about 30, and most preferably about 10 to about 20. Copolymerization of the sodium styrene sulfonate monomer and methacrylamidopropyltrimethylammonium chloride monomer is effected at a temperature of about 30 to about 90, more preferably at about 40 to about 70, and most preferably at about 50 to about 60 for a period of time of about 1 to about 24 hours, more preferably about 3 to about 10, and most preferably about 4 to about 8.

A suitable method of recovery of the formed water soluble copolymer from the aqueous reaction solution comprises precipitation in acetone, methanol, ethanol, and the like.

Suitable free radical initiators for the free radical copolymerization of the sodium styrene sulfonate monomer and the methacrylamidopropyltrimethylammonium chloride monomer are selected from the group consisting of potassium persulfate, ammonium persulfate, benzoyl peroxide, hydrogen peroxide, azobisisobutyronitrile, and the like. The concentration of the free radical initiator per 100 grams of total monomer, more preferably about 0.01 to about 1.0, and most preferably about 0.05 to about 0.1.

It should be pointed out that neither the mode of polymerization (solution, suspension, or emulsion polymerization technique, and the like), nor the initiation is critical, provided that the method or the products of the initiation step does not inhibit production of the polyampholyte or chemically modify the initial molecular structure of reacting monomers.

Typical water soluble monomers incorporated into the copolymers that are envisioned in the present invention are listed as follows:

Anionic: 2-acrylamido-2-methylpropane sulfonic acid, sodium styrene sulfonate, (meth)acrylic acid, 2-sulfoethylethacrylate, and the like.

Cationic: methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium methosulfate, 2-acrylamido-2-methylpropyltrimethylammonium chloride, vinylbenzyltrimethylammonium chloride, and the like.

These monomers possess the appropriate water solubility for polymerization to take place.

DESCRIPTION OF THE PREFERRED EMBODIMENTS

The following examples illustrate the present invention, without; however, limiting the same hereto.

EXAMPLE 1

Into a one liter-4 neck flash add:
27.0 g. MAPTAC (50% solution)
27.2 g. Potassium styrene sulfonate
300 ml. Distilled water The anionic and cationic monomers were added to the aqueous phase without attempting to form ion-pair comonomers that do not possess nonpolymerizable counterions. The solution was purged with nitrogen gas for one hour to remove dissolved oxygen. As the nitrogen gas purging began, the solution was heated to 50° C. At this point, 0.3 g. azobisisobutyronitrile was added to the solution. After six hours, the polymer was precipitated from solution with acetone. Subsequently, the resulting polymer was washed several times with a large excess of acetone and dried in a vacuum oven at 60° C. for 24 hours. Analytical analysis shows that this polyampholyte contains a "residual" 6.0 mole % sodium neutralized styrene sulfonate moieties.

Table 1 shows representative data on the reduced viscosity as a function of polymer concentration of this copolymer composed of approximately 94 mole % anionic-cationic complex and 6 mole % sodium styrene sulfonate (SSS). This polymer was synthesized by the free radical type polymerization in an aqueous solvent system as described previously.

The viscosity was measured in salt (in this example, cesium chloride) water as the data in Table 1 shows. An important conclusion that can be drawn from the data is the marked viscosity enhancement as the concentration of cesium chloride is increased. The viscosity (at 0.25 g/dl polymer level) has increased approximately by a factor of a 2 with the addition of 4.M (i.e., 4. Molar) cesium chloride. Essentially similar results are observed in hydrochloric acid solution (see Table 2). That is, the viscosity of the copolymer increases even to an extremely high acid level. This expansion of the chain is due to a polyelectrolyte effect which allows the coil to expand significantly its hydrodynamic volume. This is an unexpected and useful phenomena for such high charge density ionomeric copolymers.

Figure 1:
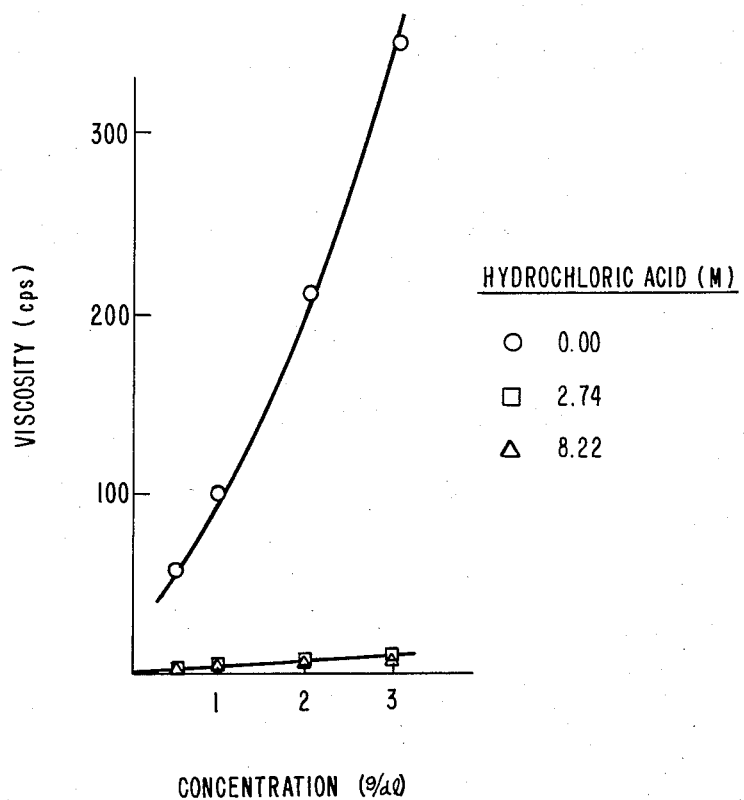
Figure 2:
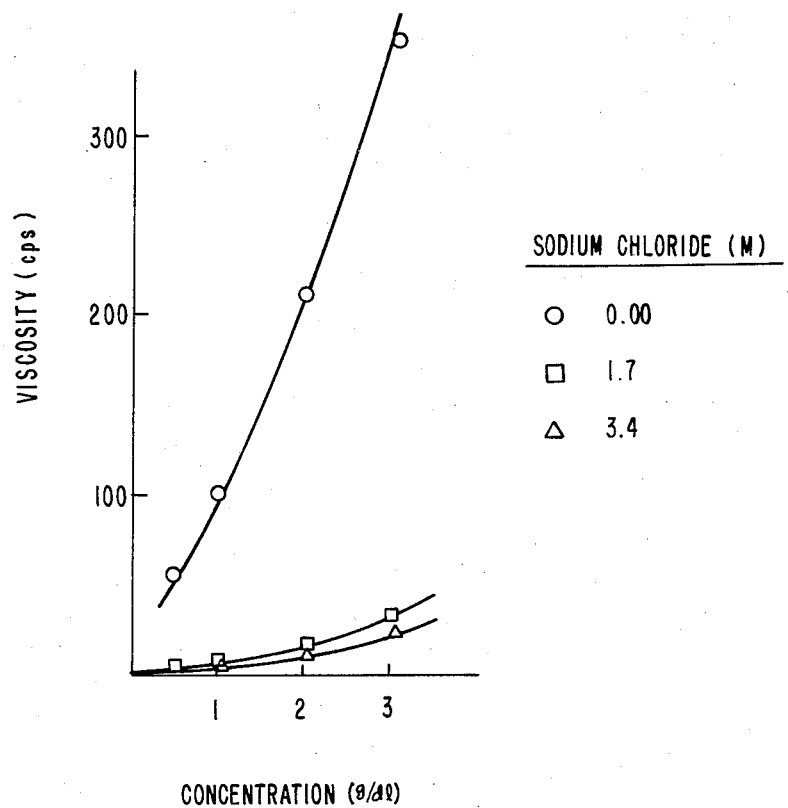

A study of copolymers with either the cationic or anionic monomer units absent would be informative in showing the necessity of having both charged species present within the polymer structure. Shown in FIGS. 1 and 2 are viscosity concentration data on an SSS-acrylamide (AM) copolymer in hydrochloric acid and sodium chloride solutions. The viscosity in fresh water is high at all polymer levels, but falls dramatically with the addition of acid or salt. This behavior is in marked contrast with the viscosity enhancement in similar solution environments as the ampholytic copolymer.

The polymeric materials of this invention appear to be useful as a particular example of a general phenomena. That is, the presence of monomeric units comprising the broad class of anionic and cationic moieties within the polymer chain are the necessary requirements for viscosity enhancement in acid, base or salt solutions.

TABLE 1

Reduced Viscosity - Concentration Data of a High Charge Density Polyampholyte In Solution a Variety of Cesium Chloride Solutions

| Reduced Viscosity | Polymer Concentration (g/dl) | Salt Concentration (M) |
|---|---|---|
| 0.21 | 0.25 | 2.0 |
| 0.23 | 0.25 | 2.6 |
| 0.43 | 0.25 | 4.0 |
| 0.22 | 1.0 | 2.0 |
| 0.26 | 1.0 | 2.6 |
| 0.37 | 1.0 | 4.0 |
| 0.31 | 3.0 | 2.0 |
| 0.35 | 3.0 | 2.6 |
| 0.42 | 3.0 | 4.0 |

TABLE 2

Reduced Viscosity - Concentration Data of a High Charge Density Polyampholyte In a Number of Hydrochloric Acid Solutions

| Reduced Viscosity | Polymer Concentration (g/dl) | Salt Concentration (M) |
|---|---|---|
| 0.44 | 0.01 | 5.5 |
| 0.50 | 0.01 | 8.2 |
| 0.58 | 0.01 | 10.1 |
| 0.24 | 1.0 | 5.5 |
| 0.33 | 1.0 | 8.2 |
| 0.56 | 1.0 | 10.1 |
| 0.38 | 3.0 | 5.5 |
| 0.52 | 3.0 | 8.2 |
| 0.77 | 3.0 | 10.1 |

What is claimed is:

1. A water soluble copolymer consisting of formula:

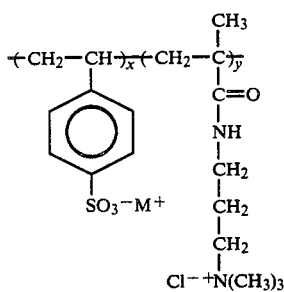

wherein x is about 1 to about 99 mole %, y is about 1 to about 99 mole %, and M is selected from the group consisting of amines and a metallic cation being selected from the group consisting of lead, iron, aluminum, Groups IA, IIA, IB and IIB of the Periodic Table of Elements, said copolymer being formed by a free radical copolymerization in a reaction solution and recovering said copolymer from said reaction solution.

2. A copolymer according to claim 1 wherein M is sodium.

3. A copolymer according to claim 1 wherein said copolymer is dissolved in an aqueous medium at a concentration of about 0.001 to about 20 grams of copolymer per 100 grams of water.

4. A copolymer according to claim 1 wherein said copolymer is dissolved in a salt solution at a concentration of about 0.001 to about 20 grams of copolymer per 100 grams of water, said salt solution having about 0.001 to about 60 grams of salt per 100 grams of said salt solution.

5. A copolymer according to claim 1 wherein said copolymer is dissolved in an acid solution at a concentration of about 0.001 to about 20 grams of copolymer per 100 grams of water, said acid solution having about 0.001 to about 30 grams of acid per 100 grams of said acid solution.

6. A copolymer according to claim 1 wherein said copolymer is dissolved in a base solution at a concentration of about 0.001 to about 20 grams of copolymer per 100 grams of water, said base solution having about 0.001 to about 60 grams of base per 100 grams of said base solution.

7. A copolymer according to claim 1 wherein said copolymer possesses a nonstoichiometric amount of anionic and cationic groups.

8. A copolymer according to claim 1 wherein said copolymer is readily soluble or dispensable in fresh water or low ionic strength aqueous solutions.

9. A copolymer according to claim 1 wherein said copolymer possesses enhanced solvent thickening efficiency in acid, base, or salt solutions.

10. A copolymer according to claim 1 wherein said copolymer is derived from water soluble anionic and cationic monomers.

* * * * *